United States Patent [19]

Sonenstein

[11] Patent Number: 4,999,128
[45] Date of Patent: Mar. 12, 1991

[54] SOIL RELEASE POLYMERS HAVING IMPROVED PERFORMANCE, STABILITY AND ECONOMY

[75] Inventor: Gerard G. Sonenstein, Piscataway, N.J.

[73] Assignee: Colgate-Palmolive Co., Piscataway, N.J.

[21] Appl. No.: 359,821

[22] Filed: Jun. 1, 1989

[51] Int. Cl.$^5$ .................. C08F 20/30; C11D 3/37
[52] U.S. Cl. .................. 252/174.14; 252/174.23; 252/174.24; 252/8.9; 252/DIG. 2; 252/DIG. 15; 525/437; 525/448
[58] Field of Search .............. 252/8.6, 174.23, 174.24, 252/DIG. 2, DIG. 15, 174.14, 8.9; 525/437, 448

[56] References Cited

U.S. PATENT DOCUMENTS

| | | | |
|---|---|---|---|
| 3,959,230 | 5/1976 | Hays | 252/8.9 |
| 4,116,885 | 9/1978 | Derstadt et al. | 252/532 |
| 4,132,680 | 1/1979 | Nicol | 252/547 |
| 4,427,557 | 1/1984 | Stockburger | 252/8.7 |
| 4,503,197 | 3/1985 | Speranza et al. | 525/437 |
| 4,759,876 | 7/1988 | Crossin | 252/543 |
| 4,785,060 | 11/1988 | Nagler | 525/444 |
| 4,863,619 | 9/1989 | Borcher et al. | 252/8.6 |
| 4,908,039 | 3/1990 | Holland et al. | 8/137 |

FOREIGN PATENT DOCUMENTS 1317278 5/1973 United Kingdom .

Primary Examiner—Prince E. Willis
Attorney, Agent, or Firm—Bernard Lieberman; Murray M. Grill; Robert C. Sullivan

[57] ABSTRACT

A soil release promoting copolymer of poly(ethylene terephthalate/ethylene isophthalate) and poly(oxyethylene terephthalate/oxyethylene isophthalate) having a weight average molecular weight in the range of 6,000 to 40,000 is prepared by reacting an ethylene terephthalate/ethylene isophthalate copolymer with polyethylene glycol in the presence of a transesterification catalyst. The soil release promoting copolymer provides improved soil release properties for oil and greasy stains on polyester fabrics at high and low wash temperatures, is stable even at high alkalinity levels, and can be used at lower loadings than conventional soil release polymers without loss of efficacy.

58 Claims, 3 Drawing Sheets

SOIL RELEASE POLYMERS HAVING IMPROVED PERFORMANCE, STABILITY AND ECONOMY

BACKGROUND OF THE INVENTION

1. Field Of The Invention

This invention relates to improved soil release promoting copolymers, method for production thereof and liquid and particulate detergent compositions containing copolymers. More particularly, this invention relates to soil release copolymers having improved hydrolytic stability and shelf life and improved soil release promoting properties, particularly for removal of oily soil from polyester fabric.

2. Description Of The Prior Art

The use of PET-POET soil release promoting polymers is well documented in the patent literature. Representative examples of the patent literature disclosing the use of PET-POET and similar polymers in the treatment of synthetic textile materials is general and in laundry detergent compositions in particular include, among others, U.S. Pat. No. 3,557,039 (and its corresponding British Patent G.B. No. 1,088,984); U.S. Pat. Nos. 3,652,713; 3,723,568; 3,959,230; 3,962,152; 4,125,370; 4,132,680; 4,569,772; and British Patent Specifications G.B. Nos. 1,154,370; 1,317,278; 1,377,092.

U.S. Pat. No. 3,557,039 to McIntyre et al. shows the preparation of such copolymers by the ester interchange and subsequent polymerization of dimethyl terephthalate (DMT) and ethylene glycol (EG) in the presence of a mixed catalyst system of calcium acetate hemihydrate and antimony trioxide. A similar reaction is shown in U.S. Pat. No. 3,959,280 to Hays, this patent further using polyethylene oxide as one reactant in addition to DMT and EG monomers. The PET-POET copolymers of Hays are characterized by a molar ratio of ethylene terephthalate units to polyethylene oxide terephthalate units of from about 25:75 to about 35:65, by the polyethylene oxide of the polyethylene oxide terephthalate having a molecular weight of from about 300 to 700, by the molecular weight of about 25,000 to about 55,000, and by a melting point below 100° C.

U.S. Pat. No. 3,652,713 forms antistatic fibers, films and other shaped articles from compositions in which polyethylene terephthalate is mixed with a polyether-polyester block copolymer such that the polyether segment constitutes from 0.1 to 10.0% by weight based on the total weight of the mixture. The polyether-polyester block copolymer can be prepared by melt-polymerizing (condensation polymerization) polyethylene terephthalate of number average molecular weight of from 1,000 to 2,000 with polyethylene glycol having a number average molecular weight of from 1,000 to 50,000 at a highly reduced pressure and elevated temperature in the presence of antimony trioxide and trimethyl phosphate.

According to G.B. No. 1,317,278 to Ambler, et al. high molecular weight (e.g. spinning grade or film-forming) polyethylene terephthalate is reacted with polyethylene glycol (MW=300 to 20,000) at a temperature in the range of 100° C. to 300° C., preferably at atmospheric pressure in the presence of conventional ester exchange catalyst, for example, antimony oxides, calcium acetate, tetraalkyltitanates and stannous octoate.

U.S. Pat. No. 4,125,370 to Nicol discloses PET-POET soil release promoting random copolymers having an average molecular weight in the range of about 5,000 to about 200,000, with a molar ratio of ethylene terephthalate to polyethylene oxide terephthalate of from about 20:80 to 90:10, the polyethylene oxide linking unit having a molecular weight in the range from about 300 to 10,000. These polymers can be prepared according to the procedure disclosed in the aforementioned patent U.S. Pat. No. 3,959,280 to Hays or by the process described in U.S. Pat. No. 3,479,212 to Robertson et al.

PET-POET soil release promoting polymers are also commercially available, for example, the products Alkaril QCJ and QCF from Alkaril Chemicals, Inc.; Milease T from ICI America; and Zelcon from E.I. duPont de Nemours and Co.

While satisfactory soil release promoting property has been obtained from the commercially available products, as described in the literature, there have been problems with regard to the stability, as well as effectiveness, of these copolymers during storage and under actual use conditions. Thus, U.S. Pat. No. 4,125,370 teaches providing a concentration of certain hardness ions to promote deposition of the soil release polymers on the fabrics being washed and to promote soil release performance. U.S. Pat. No. 4,569,772 teaches that detergent compositions containing PET-POET polymers tend to lose their soil release promoting properties on storage if the compositions contain alkaline builders. The patentees overcome the tendency by comelting the PET-POET copolymer with a water soluble alkali metal polyacrylate and converting the melt to solid particles.

Nevertheless, still further improvements are required for the stability and oily soil release properties of soil release promoting copolymers, especially at low temperatures and under alkaline wash conditions. Furthermore, since the detergent compositions containing soil release promoting polymers are intended primarily for use as a consumer item for sale to individual users for home laundry washing machines it is apparent that cost of additives is a critical factor for the manufacturer and, therefore, any means which can lower production costs without adversely affecting performance or consumer acceptance is of great practical importance.

Generally, those of skill in the art relating to the soil release promoting polymers have concentrated their efforts towards improving product performance by modifying the ratios of PET to POET, or modifying molecular weight of the oxyethylene linking units or by adding still additional stabilizing ingredients, and so on.

SUMMARY OF THE INVENTION

Accordingly, it is an object of the invention to provide soil release promoting polymers with improved performance, particularly for hard to remove oily soils on hydrophobic fabrics.

It is a further object of the invention to provide soil release promoting polymers with improved hydrolytic stability, particularly in the presence of highly alkaline builders (e.g., sodium carbonate and sodium formate (pH 10-11)).

It is another object of the invention to provide an improved process for preparing soil release promoting polymers.

Still another object of the invention is to reduce the cost of detergent compositions containing same.

A corresponding object of the invention is to provide built liquid and solid particulate laundry detergent compositions having improved cleaning performance at low temperatures as well as high temperatures and under highly alkaline as well as at neutral or slightly alkaline washing conditions for removing oily soils from polyester and other hydrophobic fabrics.

These and other of the objects and goals accomplished by the present invention, which will become more apparent after reading the following detailed description and specific examples, have been accomplished by the discovery that certain copolyester resins have better soil release properties against a variety of soils and fabrics than other copolymers, and that the polymerization conditions to form such polymers may be significantly milder than those previously utilized, thereby significantly lowering cost of production of the soil release polymer and simultaneously minimizing thermo-oxidative degradation which results in dark polymers of reduced molecular weight and performance.

The soil release promoting copolymer of this invention has a molecular weight (weight average, $\overline{M}w$) of from about 6,000 to about 40,000, preferably about 25,000 to about 40,000, and most preferably about 25,000 to about 35,000, and may be prepared by a transesterification reaction between a polyester or copolyester and a polyalkylene glycol in the presence of a transesterification catalyst system. The reaction is carried out at an elevated temperature such as 100° C. to 250° C. and at reduced pressure, such as less than 5 mm Hg. In the product copolymer, the polyalkylene $-(OCnH_{2n})_{\overline{x}}$ linking units should have a molecular weight in the range of from about 500 to about 18,000. The soil release copolymers can be added in soil release promoting proportions to liquid or solid (granular or powdery) particulate detergent compositions including one or more water-soluble anionic, nonionic, zwitterionic, cationic and ampholytic surface active agents, and one or more water-soluble or water-dispersible detergent builder compounds.

In a first aspect, the present invention provides a substantially water-soluble soil release promoting polymer of the formula

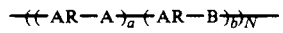

wherein each moiety AR of the polymer is independently selected from acid residues of carboxylic acids having at least two carboxylic acid groups;
A is the moiety $-CnH_{2n}-(OCnH_{2n})_{x-1}$;
B is the moiety $-CmH_{2m}-$ or the moiety

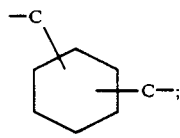

x is a number from about 12 to about 410; inclusive
n is a number of from 2 to 4, inclusive;
m is a number of from 2 to 4 inclusive;
$a+b=1.00$;
a is a number of from about 0.20 to about 0.50, inclusive; and
N is an integer such that the weight average molecular weight of the polymer is from about 6,000 to about 40,000;

with the proviso that at least 50% of the total acid residues of carboxylic acids having at least two carboxylic acid groups are terephthalic acid residues; and with the further proviso that, when B is $-CmH_{2m}-$, at least 10% of the total acid residues of carboxylic acids having at least two carboxylic acid groups are a single isomeric form of a carboxylic acid having at least two carboxylic acid groups which is other than terephthalic acid.

In a particularly preferred embodiment of this first aspect of the invention, the soil release promoting polymer is of the formula

wherein each moiety AR of the polymer is independently selected from isomeric phthalic acid residues of the formula

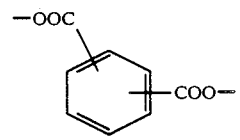

with at least 50% of the total phthalic acid residues being terephthalic acid residues and with at least 10% of the total phthalic acid residues being isophthalic acid residues;
$n=m=2$;
x is a number of from 12 to 410, inclusive;
$a+b=1.00$;
a is a number of from about 0.20 to about 0.50, inclusive; and
N is an integer such that the weight average molecular weight of the polymer is from 25,000 to 40,000.

In a further aspect of the invention, there is provided a method for preparing a substantially water-soluble soil release promoting polymer of the formula

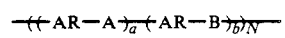

wherein each moiety AR of the polymer is independently selected from acid residues of carboxylic acids having at least two carboxylic acid groups;
A is the moiety $-CnH_{2n}-(OCnH_{2n})_{x-1}$;
B is the moiety $-CmH_{2m}-$ or the moiety

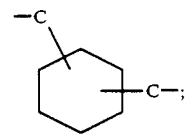

x is a number from about 12 to about 410; inclusive;
n is a number of from 2 to 4, inclusive;
m is a number of from 2 to 4 inclusive;
$a+b=1.00$;
a is a number of from about 0.20 to about 0.50, inclusive; and
N is an integer such that the weight average molecular weight of the polymer is from about 6,000 to about 40,000;

with the proviso that at least 50% of the total acid residues of carboxylic acids having at least two carboxylic acid groups are terephthalic acid residues; and with the further proviso that, when B is —$CmH_2m$—, at least 10% of the total acid residues of carboxylic acids having at least two carboxylic acid groups are a single isomeric form of a carboxylic acid having at least two carboxylic acid groups which is other than terephthalic acid; said method comprising:

contacting a polyester of the formula $$-(AR-B)_M-$$

wherein AR and B are as defined above, and

M is an integer such that the weight average molecular weight of the polyester is from about 45,000 to about 75,000 with a polyol of the formula $$H-(OCnH_{2n})_x-OH$$

wherein n and x are as defined above, under reduced pressure and at a temperature in the range of from about 100° C. to no more than about 250° C. in the presence of a catalytically effective amount of a transesterification catalyst, wherein said polyester is present in an amount of about 15 to about 20% by weight, based on the sum of the polyester and polyol.

In a still further aspect of the invention there is provided a soil release promoting built laundry detergent composition comprising a detersively effective amount of at least one surfactant selected from the group consisting of water-soluble nonionic surface active agents and mixtures of anionic and nonionic surface active agents;

a detergent building effective amount of at least one water-soluble or water-dispersible detergent builder; and a soil release promoting amount of substantially water-soluble soil release promoting polymer of the formula $$-((AR-A)_a(AR-B)_b)_N-$$

wherein each moiety AR of the polymer is independently selected from acid residues of carboxylic acids having at least two carboxylic acid groups;

A is the moiety —$CnH_2n$—$(OCnH_{2n})_{x-1}$;
B is the moiety —$CmH_2m$—or the moiety $$-C\underset{\phantom{x}}{\overset{\phantom{x}}{\diagdown}}\bigcirc\underset{\phantom{x}}{\overset{\phantom{x}}{\diagup}}C-;$$

x is a number from about 12 to about 410; inclusive;
n is a number of from 2 to 4, inclusive;
m is a number of from 2 to 4 inclusive;
a+b=1.00;
a is a number of from about 0.20 to about 0.50, inclusive; and
N is an integer such that the weight average molecular weight of the polymer is from about 6,000 to about 40,000;

with the proviso that at least 50% of the total acid residues of carboxylic acids having at least two carboxylic acid groups are terephthalic acid residues; and with the further proviso that, when B is —$CmH_2m$—, at least 10% of the total acid residues of carboxylic acids having at least two carboxylic acid groups are a single isomeric form of a carboxylic acid having at least two carboxylic acid groups which is other than terephthalic acid.

In a particularly preferred embodiment of this aspect of the invention, the soil release polymer is of the formula $$-((AR-CnH_{2n}(OCnH_{2n})_{x-1})_a(AR-CmH_{2m})_b)_N-$$

wherein each moiety AR of the polymer is independently selected from isomeric phthalic acid residues of the formula $$-OOC-\bigcirc-COO-$$

at least 50% of the total phthalic acid residues being terephthalic acid residues and with at least 10% of the total phthalic acid residues being isophthalic acid residues;

n=m=2;
x is a number of from 12 to 410, inclusive;
a+b=1.00;
a is a number of from about 0.20 to about 0.50, inclusive; and
N is an integer such that the weight average molecular weight of the polymer is from 25,000 to 40,000.

BRIEF DESCRIPTION OF THE DRAWING FIGURES

DETAILED DESCRIPTION OF THE INVENTION

Figure 1:
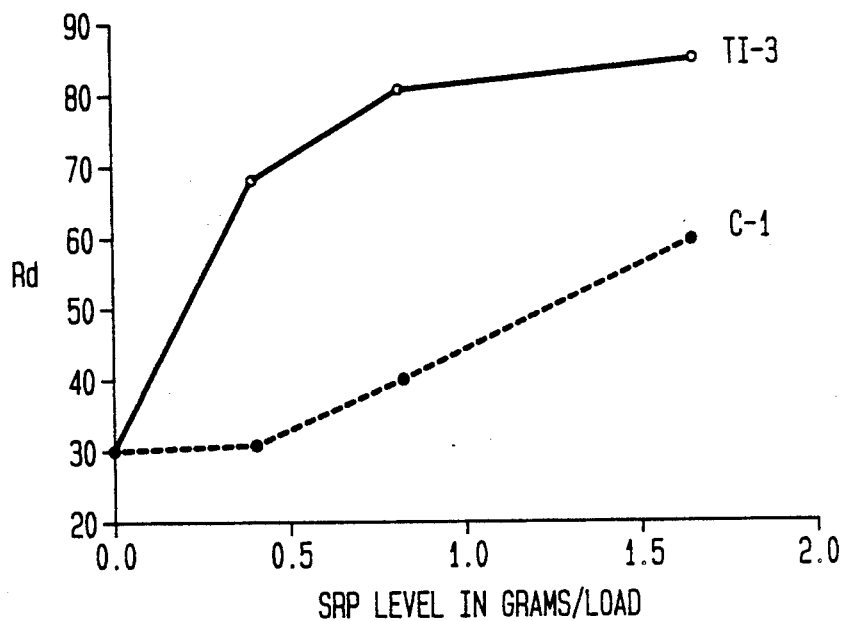
FIG. 1 is a plot of soil release, as measured by fabric whiteness (Gardner (Rd)), vs. soil release polymer (SRP) loading (grams/load) for Dacron ® double knit.
Figure 2:
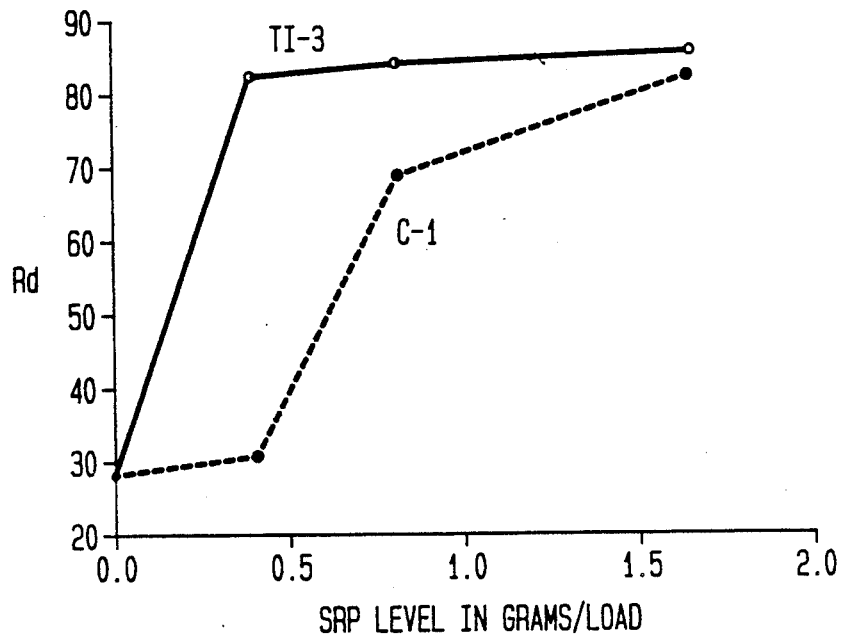
FIG. 2 is a plot of soil release, as measured by fabric whiteness (Gardner (Rd)), vs. soil release polymer (SRP) loading (grams/load) for Dacron ® single knit.
Figure 3:
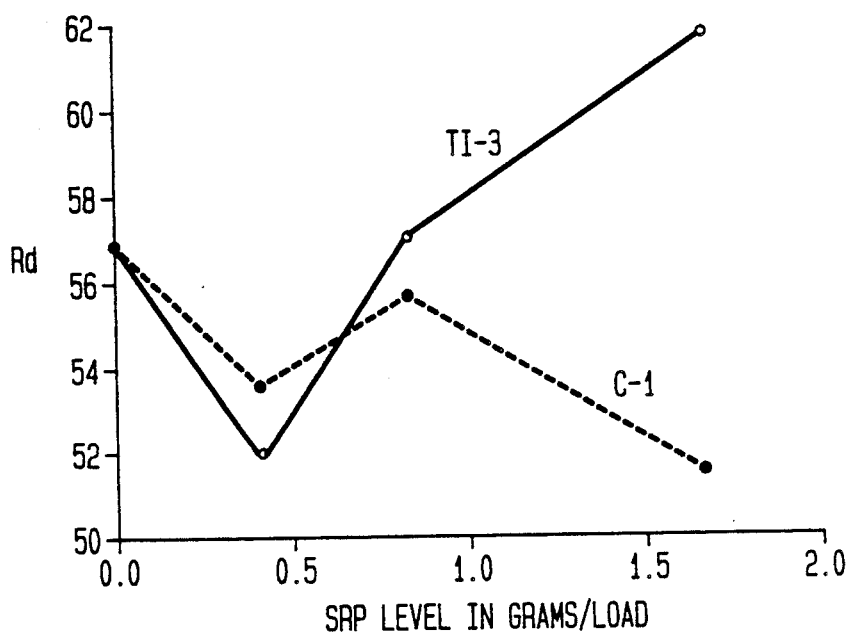
FIG. 3 is a plot of soil release, as measured by fabric whiteness (Gardner (Rd)), vs. soil release polymer (SRP) loading (grams/load) for Dacron ® (65)/Cotton (35).

Although the patent literature discussed above mentions broad ranges of molecular weights of PET-POET copolymers, e.g. 5,000 to 200,000, and even provides some teaching for increasing molecular weights, there does not appear to be any recognition or appreciation that the performance or stability of the copolymer is a function of the composition of the hydrophobic component.

Therefore, it was most surprising to find that with a PET-POET soil release copolymer produced from polyethylene terephthalate and polyethylene glycol the stability and performance were significantly better when the content of isomeric phthalic acid residues was increased.

The starting polyester is of the formula

Each moiety AR is independently selected from acid residues of carboxylic acids having at least two carboxylic acid groups, with the proviso that at least 50 mole % of the acid residues are terephthalic acid residues, and with the further proviso that when B is —$C_mH_{2m}$—, at least 10 mole % of the residues are a single isomeric form of acid other than terephthalic acid Such residues correspond to the formula $R^2(COO)_n$ wherein $R^2$ is an alkyl group of 4 to 12 carbon atoms having a valence of n or an aryl group of 6 to 10 carbon atoms having a valence of n, and n is an integer of 2 or more, preferably 2. Such acid residues are derived from organic acids such as succinic acid ($HOOC(CH_2)_2COOH$), adipic acid ($HOOC(CH_2)_4COOH$), azelaic acid ($HOOC(CH_2)_7COOH$), and the phthalic acids

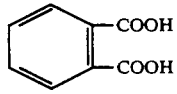 orthophthalic acid,

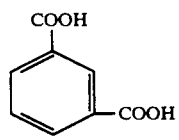 isophthalic acid, and

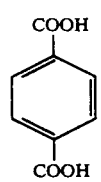 terephthalic acid.

Terephthalic acid is preferred, and a mixture of terephthalic and isophthalic acids is particularly preferred.

The moiety B is —$C_mH_{2m}$—, where m is a number of from 2 to 4, inclusive; or

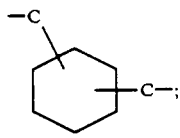

M is an integer such that the weight average molecular weight of the polyester is from about 45,000 to 75,000, preferably about 60,000.

Particularly preferred starting polyesters include poly(ethylene terephthalate/ethylene isophthalate) copolymers (PET/PEI) and ethylene terephthalate/cyclohexane dimethylol copolymers. Such polymers are commercially available and may be provided in the form of fibers, coarse granules, chips, pellets, etc.

The other starting reactant is a polyol of the formula $$H-OC_nH_{2n})_x OH,$$

wherein n is a number from 2 to 4, inclusive; and x is a number from about 12 to about 410, preferably 72 to 110, inclusive, and most preferably about 90. Suitable polyols include polyethylene glycols, polypropylene glycols, polybutylene glycols, and copolymers of ethylene glycol and butylene glycol. Polyethylene glycols (PEG) are particularly preferred and these are readily commercially available under the trade name Carbowax, a product of Union Carbide.

The product polymer is a linear block copolymer of the formula

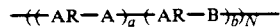

wherein each moiety AR of the polymer is independently selected from acid residues of carboxylic acids having at least two carboxylic acid groups;

A is the moiety —$C_nH_{2n}$—$(OCC_nH_{2n})_{\overline{x-1}}$;

B is the moiety —$C_mH_{2m}$—or the moiety

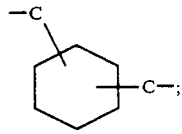

x is a number from about 12 to about 410; inclusive;
n is a number of from 2 to 4, inclusive;
m is a number of from 2 to 4 inclusive;
a+b=1.00;
a is a number of from about 0.20 to about 0.50, inclusive; and
N is an integer such that the weight average molecular weight of the polymer is from about 6,000 to about 40,000;
with the proviso that at least 50% of the total acid residues of carboxylic acids having at least two carboxylic acid groups are terephthalic acid residues; and
with the further proviso that, when B is —$C_mH_{2m}$—, at least 10% of the total acid residues of carboxylic acids having at least two carboxylic acid groups are a single isomeric form of a carboxylic acid having at least two carboxylic acid groups which is other than terephthalic acid; and
wherein the indicated polymer segments are chemically bonded by the transesterification reaction, under melt polymerization conditions.

The melt condensation polymerization is performed at elevated temperature, such as 100° C. to 250° C., preferably from about 200° C. to 250° C. and at a reduced pressure, such as about 5 mm Hg, preferably less than 1 mm Hg, for example, 0.1 to 0.2 mm Hg, in the presence of the catalyst system.

In a typical procedure, from about 50 to 100 parts PET/PEI and 450 to 400 parts PEG are mixed at from about 90° C. to 180° C. (at least above the melting temperature of the reactant having a lower melting point) under vacuum and a catalytically effective amount, such as from about 0.01 to 1.0 part, preferably from about 0.1 to 0.50 part, of the catalyst system is added to the mixture. The temperature is raised to from about 200° C. to 250° C., preferably 220° C. to 230° C., and the reaction proceeds with liberation of ethylene glycol. At the completion of the reaction, generally about 0.5 to 4 hours, the vacuum is released and the product is cooled at ambient temperature.

The catalyst system may include any conventional transesterification catalyst. However, compounds of the formula $M(OR)_2$, wherein M is Zr, Ge, Sn or Ti and R is an alkyl group or an aryl group, have been found to be particularly effective transesterification catalysts. Suitable alkyl groups include alkyl groups having up to about 12 carbon atoms, which may be linear or branched, preferably alkyl groups having up to 4 carbon atoms, with ethyl and isopropyl being particularly preferred. Suitable aryl groups include aryl groups having up to about 10 carbon atoms, e.g., phenyl, methyl phenyl, dimethyl phenyl, ethyl phenyl and naphthyl. Titanium is particularly preferred as the metal, with titanium tetraisopropoxide being especially preferred.

Certain additional tin compounds have also been found to be particularly effective catalysts. In particular, compounds of the formulae $(R^1)_2SnO$ and $(R^1)_2Sn(OC(O)R^2)_2$, wherein $R^1$ is an alkyl group and $R^2$ represents hydrogen or an alkyl group of up to about 3 carbon atoms, have been found to be particularly effective catalysts Suitable alkyl groups for $R^1$ include alkyl groups having up to about 12 carbon atoms, which may be linear or branched, preferably alkyl groups of up to 4 carbon atoms with butyl being particularly preferred. Suitable alkyl groups for $R^2$ include methyl, ethyl, propyl and isopropyl, with methyl being particularly preferred.

Unexpectedly, the aforementioned tin compounds provide a secondary benefit in that, under plant conditions where a rigorous vacuum (below 1 to 5 mm Hg) cannot be maintained, the polymer product is not significantly discolored but remains very white even though higher temperatures (than set forth above) may be utilized. This advantage may be related to an anti-oxidant protection afforded by the organo tin compounds. Dibutyl tin oxide and dibutyl tin diacetate are especially preferred catalysts.

The product copolymer having a molecular weight Mw of from 6,000 to 40,000, preferably about 25,000 to about 40,000, most preferably about 25,000 to about 35,000, has excellent soil release promoting properties when applied to polyester or polyester blend (usually with cotton) fabrics, either directly from a solution or dispersion thereof, but primarily as a component of or additive to laundry detergent compositions. It has been found that laundry, especially laundry in which the fabrics are of polyesters or polyester blends (usually with cotton), more readily release various soils to the wash water during washing with built synthetic organic detergent compositions, especially those based on nonionic detergents, if the soiling of the laundry takes place after it has been washed with such a detergent composition containing the soil release polymer. Some of the polymer is held to the laundry during the washing operation so that it is present thereon when the laundry is subsequently soiled, and its presence promotes the removal of the soil and/or stain during a subsequent washing.

Surprisingly, it has been found that the soil release promoting activity of the polymer in detergent compositions is only slightly reduced when it is subjected to contact with alkaline materials, as in such built detergent compositions in which the builder salt is alkaline as many of them are, or is used at high washing temperature, e.g. above 100° F. In this regard, it should be noted that state-of-the-art soil release polymers, i.e. polyethylene terephthalate/polyoxyethylene terephthalate (PET/POET) copolymers, are very labile to alkaline hydrolysis and thus rapidly lose performance in the initial wash cycle when subjected to contact with alkaline materials or use at high washing temperatures.

The detergent compositions to which the polymers of this invention may be added or in which such may be included, to give the detergent composition desirable soil release promoting properties, are built synthetic organic detergent compositions. The synthetic organic detergent will normally be a nonionic detergent, or mixtures of nonionic and anionic detergents, small amounts of amphoteric or zwitterionic detergents may also be useful under certain conditions.

The anionic detergent which may be employed is preferably a higher linear alkylbenzene sulfonate or a higher fatty alcohol polyethoxylate sulfate. Normally, water soluble salts of such materials are preferred, such as the alkali metal salts, and of these, sodium salts are usually preferred over the potassium salts. When the anionic detergent is a sodium higher alkylbenzene sulfonate, the higher alkyl will normally be of 10 to 18 carbon atoms, preferably 12 to 16 carbon atoms and more preferably 12 or 13 carbon atoms, e.g. 12. When such anionic detergent is a higher fatty alcohol polyethoxylate sulfate, the higher fatty alcohol will be of 10 to 20 carbon atoms, preferably 12 to 16 carbon atoms and more preferably 12 to 13 or 12 to 15 carbon atoms, and the polyethoxylate will include 2 or 3 to 20 ethoxy groups, preferably 3 to 10 thereof, and more preferably 3 to 6, e.g. 3. Mixtures of such anionic detergents may be employed, usually in ratios of 1:10 to 10:1, such as 1:2 to 2:1.

Of the nonionic detergents it is preferred to employ those which are condensation products of ethylene oxide and/or propylene oxide with each other and with hydroxyl-containing bases, such as higher fatty alcohols, oxo-type alcohols and nonyl phenol. Most preferably the higher fatty alcohol is employed and is of 10 to 20 carbon atoms, preferably 12 to 15 or 16 carbon atoms, and the nonionic detergent contains from about 3 to 20 or 30 ethylene oxide groups per mole, preferably 6 to 11 or 12. Most preferably the nonionic detergent will be one in which the higher fatty alcohol is of about 12 to 15 or 12 to 14 carbon atoms and which contains from 6 or 7 to 11 moles of ethylene oxide. Among such detergents is Alfonic ® 1214-60C, sold by Conoco Division of E.I. duPont de Nemours, Inc., and Neodols ® 23-6.5 and 25-7, available from Shell Chemical Co. Among their especially attractive properties, in addition to good detergency with respect to oily and greasy soil deposits on goods to be washed, and excellent compatibility with the present polymeric release agents, is a comparatively low melting point, which is still appreciably above room temperature, so that in the case of said detergent compositions they may be sprayed onto base beads as a liquid which solidifies quickly after it has penetrated into the beads. In addition, they have a compatibility with soluble anionic detergents of the linear higher alkylbenzene sulfonate and higher fatty alcohol polyethoxylate sulfate types, and long term viscosity stability, especially in aqueous alcoholic solutions.

Various builders and combinations thereof which are effective to complement the washing action of the nonionic synthetic organic detergent(s) and to improve such action include both water soluble and water insoluble builders. Of the water soluble builders, which preferably are employed in mixture, both inorganic and organic builders may be useful. Among the inorganic builders those of preference include: various phosphates, usually polyphosphates, such as the tripolyphosphates and pyrophosphates, more specifically the sodium tripolyphosphates and sodium pyrophosphates, e.g. pentasodium tripolyphosphate, tetrasodium pyrophosphates; sodium carbonate, sodium bicarbonate; and sodium silicate; and mixtures thereof Instead of a mixture of sodium carbonate or sodium bicarbonate, sodium sesquicarbonate may often be substituted. The sodium silicate, when employed is normally of $Na_2O$:$SiO_2$ ratio within the range of 1:1.6 to 1:3, preferably 1:2.0 to 1:2.4 or 1:2.8, e.g. 1:2.4.

Of the water soluble inorganic builder salts the phosphates will usually be employed with a lesser proportion of sodium silicate, the carbonates will be employed with bicarbonate, and sometimes with a lesser proportion of sodium silicate, and the silicate will rarely be used alone Instead of individual polyphosphates being utilized it will sometimes be preferred to employ mixtures of sodium pyrophosphate and sodium tripolyphosphate in proportions within the range of 1:10 to 10:1, preferably 1:5 to 5:1. Of course, it is recognized the changes in phosphate chemical structure may occur during crutching and spray drying so that the final product may differ somewhat from the components charged to the crutcher.

Of the water soluble organic builders, nitrilotriacetic acid salts, e.g. trisodium nitrilotriacetate (NTA), preferably employed as the monohydrate, are preferred. Other nitrilotriacetates, such as disodium nitrilotriacetate, are also useful. The various water soluble builder salts may be utilized in hydrated forms, which are often preferred. Other water soluble builders that are considered to be effective include the inorganic and organic phosphates, borates, e.g. borax, citrates, gluconates, ethylene diamine tetraacetates and iminodiacetates. Preferably the various builders will be in the forms of their alkali metal salts, either the sodium or potassium salts, or mixtures thereof, but sodium salts are normally more preferred. In some instances, as when neutral or slightly acidic detergent compositions are being produced, acid forms of the builders, especially of the organic builders, may be preferable but normally the salts will either be neutral or basic in nature, and usually a 1% aqueous solution of the detergent composition will be of a pH in the range of 9 to 11.5, e.g. 9 to 10.5.

Insoluble builders, generally of the Zeolite A type, may be used advantageously in the compositions of the present invention, and of these, hydrated Zeolites X and Y may be useful too, as may be naturally occurring zeolites and zeolite-like materials and other ionexchanging insoluble compounds that can act as detergent builders. Of the various Zeolite A products, Zeolite 4A has been found to be preferred. Such materials are well known in the art and methods for their manufacture need not be described here. Usually such compounds will be of the formula

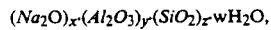
$(Na_2O)_x \cdot (Al_2O_3)_y \cdot (SiO_2)_z \cdot wH_2O$, wherein x is 1, y is from 0.8 to 1.2, preferably about 1, z is from 1.5 to 3.5, preferably 2 to 3 or about 2, and w is from 0 to 9, preferably 2.5 to 6.

The zeolite builder should be a univalent cationexchanging zeolite, i.e. it should be an aluminosilicate of a univalent cation such as sodium, potassium, lithium (when practicable) or other alkali metal or ammonium. Preferably the univalent cation of the zeolite molecular sieve is an alkali metal cation, especially sodium or potassium, and most preferably it is sodium. The zeolites, whether crystalline or amorphous, are capable of reacting sufficiently rapidly with calcium ions in hard water so that, alone or in conjunction with other water softening compounds in the detergent composition, they soften the wash water before adverse reactions of such ions with other components of the synthetic organic detergent composition occur. The zeolites employed may be characterized as having a high exchange capacity for calcium ion, which is normally from about 200 to 400 or more milligram equivalents of calcium carbonate hardness per gram of the aluminosilicate, preferably 250 to 350 mg. eq./g., on an anhydrous zeolite basis. Also they preferably reduce the hardness quickly in wash water, usually within the first 30 seconds to five minutes after being added to the wash water, and lower the hardness to less than a milligram of $CaCO_3$ per liter within such time. The hydrated zeolites will normally be of a moisture content in the range of 5 to 30%, preferably about 15 to 25% and more preferably 17 to 22%, e.g. 20%. The zeolites, as charged to a crutcher mix from which base beads may be made, should be in finely divided state, with the ultimate particle diameters being up to 20 microns, e.g. 0.005 to 20 microns, preferably 0.01 to 8 microns mean particle size, e.g. 3 to 7 microns, if crystalline, and 0.01 to 0.1 micron, e.g. 0.01 to 0.05 micron, if amorphous. Although the ultimate particle sizes are much lower, usually the zeolite particles will be of sizes within the range of No. 100 to 400 sieve, preferably No. 140 to 325 sieve, as charged to the crutcher for the manufacture of the base beads. In the base beads the zeolite(s) will often desirably be accompanied by a suitable builder salt or salts, e.g. sodium carbonate, sodium bicarbonate. Sodium silicate may tend to agglomerate with zeolites so the proportion thereof present in zeolite-built base beads may be limited, as to 2 or 3%, or it may be omitted, especially for carbonate-containing formulations, but sometimes as much as 5 to 10% may be present, as in NTA-built products.

When employing the preferred nonionic detergents in detergent compositions to which the powder or flakes of the present invention are added to impart soil release promoting properties, while phosphate builders are useful, often carbonate builder is preferred. The carbonate, being of the higher alkalinity, has a more detrimental effect on the stability of conventional PET-POET polymers and, accordingly, detergent compositions built with it, and which contain conventional PET-POET polymer, can often lose the soil release promoting activity of the polymer after relatively short storage periods. Accordingly, the need for the present invention is often greatest for detergent compositions built with carbonate.

In addition to the synthetic organic detergent and builder, detergent compositions will usually also contain a limited proportion of moisture and various adjuvants. Among the adjuvants are fabric softening materials, such as bentonite and other clay fabric softeners, fluorescent brighteners, such as the distilbene brighteners, enzymes, such as proteolytic and amylolytic enzymes, colorants, such as dyes and pigments, and perfumes.

In preferred solid particulate detergents the nonionic detergent (preferably Neodol 23-6.5), is post-sprayed onto base beads (largely builder) and constitutes from 1 to 65%, more preferably 2 to 40% and most preferably about 20% of the final composition. In the final particulate composition the moisture content will usually be from 0.5 to 20%, preferably 5 to 10%, e.g. about 7 or 8%, the fabric softening clay content will usually be up to about 10%, such as from 1 to 5%, preferably 2 to 4%, e.g. 3%, the enzyme content will usually be up to about 5%, normally from 0.5 to 3%, preferably 1 to 2%, e.g. 1.5%, and the soil release polymer content will be from 0.1 to 20%, preferably 0.1 to 10%, and more preferably about 0.1 to 5%. Such compositions may also often have presented a relatively small proportion, usually from 0.5 to 3%, of magnesium sulfate, which is added to the crutcher to prevent undesirable settling of the crutcher mix for the base beads.

To manufacture the detergent compositions described a crutcher mix is made at a temperature of about 50° C. to 70° C. and a moisture content of about 30 to 60%, of the clays, builders, magnesium sulfate, colorants and fluorescent brightener, and such is spray dried, in the normal manner, using a conventional production spray tower in which hot combustion products dry atomized droplets of the crutcher mix to the base beads, which normally will be of particle sizes in the range of 10 to 100, U.S. Sieve Series. Onto such dried particles there will be sprayed or dripped molten nonionic detergent, which will be absorbed by the beads and will solidify in them, after which there will be mixed with the built detergent composition resulting the powdered or flaked soil release polymer, of particle sizes less than No. 30, U.S. Sieve Series (preferably 30-100). Enzyme powder, if present, will then be mixed in. Alternatively, in some processes the soil release polymer may be mixed with the enzyme powder before blending with the rest of the particulate detergent. In some procedures the soil release polymer may be blended with the base beads before application of the nonionic detergent, and the nonionic detergent may then serve to hold the polymer particles more strongly to the base beads. The various blending operations may be conducted in conventional inclined drum or twin-shell blenders or in other suitable equipment. Perfume, when present, may be applied at any suitable stage but usually is the last added component.

Alternatively, the soil release promoting polymers may be added to or incorporated in liquid detergent formulations which may be aqueous systems or may be anhydrous or at least substantially anhydrous. In the anhydrous system, the liquid carrier system is typically comprised totally or predominantly of liquid nonionic surfactant. In the aqueous form, the aqueous medium employed includes water and preferably also includes a lower alkanol. The water is desirably deionized water but city water of a hardness content up to about 300 ppm, as calcium carbonate (the hardness is usually of mixed magnesium and calcium ions) may be employed, although it is preferable for the hardness content to be less than 100 ppm to help to avoid any destabilization of the liquid detergent or separations of parts thereof. The lower alkanol may be methanol, ethanol, isopropanol or n-propanol but ethanol is much preferred. When ethanol is employed, it will normally be as a denatured alcohol, such as 3A, which includes a small portion of water plus denaturant. Small amounts of compatible dissolved salts may also be present in the aqueous medium but normally such will be avoided.

Another liquid that may desirably be employed in the present liquid detergents is a lower glycol, such as one of 3 to 6 carbon atoms in the alkyl group thereof. While hexylene glycol may be utilized in some formulations, in some others it can promote instability, so propylene glycol is preferred.

Together with the combination of synthetic organic detergent, soil release promoting polymer and aqueous medium there will often be present a fluorescent brightener, such as one of the aminostilbene type. Such a brightener is substantive to the laundry and helps to improve its appearance after washing. A preferred such brightener is Tinopal 5BM Extra Conc., marketed by CIBA-Geigy.

Various suitable adjuvants may be present in the invented liquid detergents, such as fluorescent dyes, colorants (dyes and water dispersible pigments, such as ultramarine blue), bactericides, fungicides and perfumes. Concentrations of such components will usually be kept low, often less than 1% and preferably less than 0.7%. Thus, the perfume concentration will be less than 1%, preferably 0.2 to 0.6%, e.g. 0.4%. The fluorescent brightener will preferably be a stilbene brightener and the content thereof will be from 0.05 to 0.25%, preferably 0.05 to 0.15%, e.g. 0.1%. Colorants, such as Polar Brilliant Blue, will be from 0.001 to 0.03%, preferably 0.002 to 0.02%, e.g. 0.0025% or 0.01%. The various adjuvant materials will be chosen for a compatibility with the other formula components and for non-separating and non-settling characteristics. Because water soluble ionizable salts, whether inorganic or organic, are generally incompatible with soil release promoting agents, their presence will usually be avoided. Generally, it will be desirable to avoid the presence of adjuvants other than colorant, perfume, fluorescent brightener and any neutralizing agents that may be employed to adjust the pH of the liquid detergent to the stable range. It is preferred that the neutralizing agent employed, usually to increase the pH of the liquid detergent mixture, will be sodium hydroxide, in aqueous solution at a concentration of from 5 to 40%, e.g. 15 to 25%. Triethanolamine salts and free triethanolamine should generally be avoided.

The liquid detergent made will be of a desirable viscosity, often in the range of 50 to 500 centipoises, preferably 100 to 200 centipoises, and the viscosity may be adjusted by modifying the proportion of lower alkanol, within the range given. The liquid detergent will be readily pourable but will possess a desired "body". The pH thereof will be in the range of 6 to 10, preferably 6.1 to 8.9 and often more preferably 6.5 to 7.5.

To make the soil release promoting liquid detergents of this invention which are of improved stability on storage, so that the soil release promoting polymer does not deteriorate and does not separate from the rest of the composition, the proportions of the various components will be such that the nonionic detergent (which includes mixtures thereof) or a mixture of nonionic and anionic detergents (both being of the synthetic organic type) will be within the range of 25 to 50% of the product, preferably being 20 to 40% for the nonionic detergent and 3 to 15% for the anionic detergent. More preferably, the proportions of such detergents will be 25 to 35% and 5 to 10%, respectively, e.g. about 32% and about 7%, respectively. The soil release promoting polymer will be about 0.1 to 10%, preferably 0.1 to 5.0%, e.g. about 2.0-2.5%. The lower alkanol content will be from 3 to 15%, preferably 5 to 12%, and more preferably 6 to 10%, e.g. about 8%, and the water content, when lower alkanol is present, will be about 30 to 60%, preferably 45 to 55%, and if no lower alkanol is present such ranges will be increased to allow for replacement of the lower alkanol with water.

As was previously indicated, the contents of ionizable water soluble salts, whether organic or inorganic, should be kept low, usually being no more than 1% of the liquid detergent, preferably less than 0.5% and more preferably less than 0.3%, and the content of triethanolamine will similarly be limited, to avoid separation of the soil release promoting polymer, with the desirable limits being 0.5%, preferably 0.2% and most preferably 0%. In some instances the salt content will be held to limits lower than the allowed alkanolamine content because some salts can be even more detrimental to product stability than the alkanolamines. Of course, the content of anionic detergent present, which may be considered to be an ionizalle salt, will not be included in the limiting proportions of such salt present because it does not appear to have the same type of destabilizing influence on the present compositions. While suitable adjuvants may be present in the liquid detergent, such as the colorant, perfume and fluorescent brightener, previously mentioned, normally the contents of such adjuvants will be minimized, usually being less than 2%, preferably less than 1% and more preferably less than 0.8%, but the dye and brightener are not destabilizing.

The liquid detergents may be made by mixing the various components thereof with the aqueous medium, preferably containing at least some of the lower alkanol, until they dissolve (or satisfactorily disperse) therein, or different components may be selectively dissolved in portions of the water and/or lower alkanol and then the various liquid fractions may be mixed together. It will often be preferable to adjust the pH of the liquid to within the range of 6.1 to 7.9, often more preferably 6.5 to 7.5, by addition of a suitable neutralizing agent which will not have a destabilizing influence on the soil release promoting polymer or the liquid product containing it, so that such polymer will not deteriorate and will not separate from the liquid detergent on storage, especially at elevated temperature. The preferred neutralizing agent is an aqueous solution of sodium hydroxide, which will normally be between 10 and 40% sodium hydroxide, preferably 15 to 25%, although more dilute concentrations may sometimes be desirable. Subsequently, the viscosity of the product may be adjusted by means of alkanol addition.

However, as mentioned above, it is one of the advantageous features of the present invention that the soil release copolymers prepared as described herein are highly resistant to deterioration even under alkaline wash conditions as will be shown below by specific examples.

The detergent composition may be used to wash (and treat) laundry containing synthetic fibers, such as those of polyester, e.g. Dacron ®, in the normal manner used in washing with other liquid or solid powdery or granular particulate detergents. However, less of the present product may be employed and in many cases the washing effects obtained will be superior. Different concentrations of the detergent may be used, normally being from about 0.02 to 0.3%, preferably 0.05 to 0.15%. Generally, it will be advised to use about ¼ cup (about 60 ml.) to ½ cup of liquid formulations or ¼ cup to 1¼ cups (depending on the density, lower density requiring higher volumes) of powdered formulations of the detergent per standard wash load (about 17 gallons, U.S., for a top loading washing machine), which is a concentration of about 0.1% of the detergent in the wash water. About the same concentration may be used when washing as in a front loading machine, although the water employed is less. Normally about 7 or 8 pounds (3 to 3.5 kg), of laundry will be charged to the washing machine. The wash water may have a temperature as low as about 50-60° F. (cold wash) and as high as about 140° F., but preferably has a temperature from about 100° F. to 120° F. ("hot water" washing). Generally, the dry weight of materials being washed and treated will be from about 5 to 15 or 20% of the weight of the aqueous washing medium, preferably about 5 to 10% thereof. The wash will be conducted with agitation over a period of about five minutes to one-half hour or one hour, often from 10 to 20 minutes. Then the washing materials will be rinsed, usually with several rinses, and will be dried, as in an automatic laundry dryer Preferably, the first washing of the material to be treated will be when that material is not unduly dirty, so that the soil release promoting polymer will be deposited on as clean a surface as possible. However, this is not necessary and improvements in the cleaning of subsequently soiled materials and swatches will be observed when no special effort is made to have the first washing be that of a cleaner substrate. Up to a limit, sometimes about 3 or 5 treatments, plural washings with the detergent of this invention increase the soil releasing properties of the treated material.

When polyester and polyester/cotton blend fabrics are washed in the manner described with the compositions of this invention, and are then soiled or spotted with dirty motor oil and washed with a detergent of this invention or another commercial detergent (often of the build type), significant removal of the lipophilic soil is noted, compared to similar treatments in which the liquid detergent employed initially did not contain any soil release promoting polymer.

The following examples illustrate the invention but do not limit it. Unless otherwise indicated, all parts are by weight and all temperatures are in ° C.

EXAMPLE 1

To a resin kettle, fitted for temperature control, agitation, $N_2$ flow and vacuum operation are charged 65 grams of an ethylene terephthalate/ethylene isophthalate copolyester having a weight average molecular weight of about 60,000 and an ethylene terephthalate/ethylene isophthalate ratio of 83/17 (6946-F, E. I. duPont de Nemours and Co.) and 435 grams of a polyethylene glycol having a weight average molecular weight of about 3350 (Carbowax-3350). The temperature is raised to about 180° C., while stirring under a vacuum of 0.1 to 1.0 mm Hg for about 75 min. to remove volatiles (mainly moisture). 0.125 g of titanium tetraisopropoxide are then injected into the reaction mixture and the kettle temperature is raised to 225° C. to initiate ester interchange and to begin distillation of ethylene glycol. The kettle temperature is then maintained at a temperature of 220° C. for about 1 hour, until the molten product appears very viscous (almost gelatinous) and no more glycol distills over. Heating is then stopped and the reaction mass allowed to cool to 200° C., at which point the vacuum is released with $N_2$ and the product is drained from the vessel. The product quickly hardens to a tough white solid which is soluble in cold water (Polymer TI-1).

EXAMPLE 2

In the same manner as Example 1, 85 grams of the 6946-F copolyester were reacted with 415 grams of Carbowax-3350 to form a tough white solid which is soluble in cold water, and has a cloud point (2% aqueous solution) of 53.5° C. and a weight average molecular weight ($\overline{M}w$) of 31,000 (Polymer TI-3).

EXAMPLE 3

In the same manner as Example 1, 90 grams of the 6946-F copolyester were reacted with 410 grams of Carbowax-3350 to form a tough white solid which is soluble in cold water (Polymer TI-4).

EXAMPLE 4

In the same manner as Example 1, 100 grams of the 6946-F copolyester were reacted with 400 grams of Carbowax-3350 to form a tough white solid which is soluble in cold water (Polymer TI-2).

Similar results are obtained utilizing an ethylene terephthalate/cyclohexane dimethylol polyester resin (PM-5011, Eastman) and Carbowax-3350 (Polymer E-2).

EXAMPLE 5

The soil release performance of the polymers was tested by washing swatches of polyester fabrics or polyamide fabrics (fine fabrics). As a first step, a deposition wash is conducted at 80° F. or 120° F. in aqueous medium containing 0.002% of the soil release polymer (SRP) and 0.02% Neodol 25-7 ®, a liquid nonionic surfactant which is a mixed fatty alcohol of from 12 to 15 carbon atoms condensed with an average of 7 moles ethylene oxide per mole of fatty alcohol. After 15 minutes wash, the swatches are hand rinsed, air dried and stained After aging overnight, a wash release at 80° F. or 120° F. is conducted in an aqueous medium containing 0.06% Fresh Start ®, a commercially available product of Colgate-Palmolive Co. which is a particulate nonionic detergent formulation obtained by post-spraying a nonionic surfactant such as Neodol 25-7 ® onto base beads, composed primarily of builders for 15 minutes. Results of these tests are shown in Tables 1 and 2.

TABLE 1

| | Soil Release Performance On Polyesters (% Soil Removal) | | | |
|---|---|---|---|---|
| Soil Release Polymer | Polyester Content Of Soil Release Polymer | 80° F. pH 8 | 120° F. pH 8 | pH 10.5 |
| TI-1 | 13% | 60 | 82 | 61 |
| TI-3 | 17% | 72 | 86 | 68 |
| TI-4 | 18% | 74 | 83 | 69 |
| TI-2 | 20% | 68 | 84 | 71 |
| C-1[A] | 13% | 66 | 75 | 33 |

[A]Alkaril 248C - a transesterification product of polyethylene terephthalate and polyoxyethylene, available from American Alkaril.

TABLE 2

| | Soil Release Performance On Polyamides (% Soil Removal) | |
|---|---|---|
| Soil Release Polymer | 80° F. pH 7.5 | 120° F. pH 7.8 |
| TI-3 | 42.5 | 50.7 |
| TI-4 | 37.3 | — |

TABLE 2-continued

| | Soil Release Performance On Polyamides (% Soil Removal) | |
|---|---|---|
| Soil Release Polymer | 80° F. pH 7.5 | 120° F. pH 7.8 |
| C-1 | 37.2 | — |
| Control[A] | 33.5 | 38.9 |

[A]No soil release polymer

EXAMPLE 6

Machine load tests were performed on sets of 14"×14" swatches. Each set contained three swatches. All washes were done at 80° F. and 100 ppm hardness. The base detergent consisted of 120 grams of Ajax Liquid ® per load. 1.2 grams of the soil release polymer were used per load. The swatches were pretreated with soil release polymer and base detergent in a full-sized (6 lb. ballast) load, stained with dirty motor oil in a 4"×6" area, then washed again, without ballast, with base detergent only. Final Rd measurements were made in five locations per swatch (four corners plus middle) for a total of fifteen readings per material Final Rd averages are reported in Table 3.

TABLE 3

| | Polymer | |
|---|---|---|
| Fabric | TI-3 | TI-3 RV[A] |
| Dacron Single Knit | 85 | 85 |
| Dacron Double Knit | 84 | 83 |
| Dacron (65)/ Cotton (35) Blend | 66 | 64 |
| Cotton Percale | 67 | 67 |
| Spun Nylon | 64 | 62 |
| Nylon Tricot | 72 | 72 |

[A]identical to TI-3 except produced under less vacuum (i.e. 5 mm hg).

EXAMPLE 7

In the same manner as Example 6, machine load tests were performed on a Dacron ®/cotton blend (D(65)C(35)), Dacron ® single knit (DSK), and Dacron ® double knit (DDK) fabrics, however, these tests were performed at varying polymer (SRP) loading. The results (final Rd averages) are reported in Table 4; and the results are plotted in FIGS. 1 (DK), 2 (DSK) and 3 (D(65)/C(35)).

TABLE 4

| Polymer Loading (Grams) | Polymer Fabric | | | | | |
|---|---|---|---|---|---|---|
| | TI-3 | | | C-1 | | |
| | D(65)C(35) | DSK | DDK | D(65)C(35) | DSK | DDK |
| 0.42 | 51.9 | 82.4 | 68.0 | 53.6 | 30.3 | 30.9 |
| 0.84 | 57.1 | 84.2 | 80.2 | 55.7 | 68.8 | 39.4 |
| 1.68 | 61.8 | 86.2 | 83.7 | 51.5 | 82.6 | 59.2 |

EXAMPLE 8

In a manner similar to Example 5, the hydrolytic stability of various polymers was evaluated by comparison of soil release (%) at various Ph's at 120° F. using 10 mg/liter of polymer. The results are set forth in Table 5.

TABLE 5

| Polymer | TI-3 | | C-1 | |
|---|---|---|---|---|
| pH | 7.5 | 10.5 | 7.5 | 10.5 |

TABLE 5-continued

| Polymer | | TI-3 | | C-1 |
|---|---|---|---|---|
| % Soil Release[A] | 65 | 44 | 41 | 15 |

[A]Average of values on a mixture of fabrics (polyesters, polyester/cotton blends, and nylons) soiled with dirty motor oil.

EXAMPLE 9

In the same manner as Example 8, the effect of loading level of various polymers was evaluated by comparison of soil release (%) at various loading levels of polymer at 80° F. and pH 7.5. The results are set forth in Table 6.

TABLE 6

| Polymer | TI-3 | | C-1 | |
|---|---|---|---|---|
| Loading Level (mg/liter) | 10 | 20 | 10 | 20 |
| % Soil Release[A] | 49 | 75 | 27 | 63 |

[A]Average of values on a mixture of fabrics (polyesters, polyester/cotton blends, and nylons) soiled with dirty motor oil.

EXAMPLE 10

In order to examine the superiority of TI-3 at low load levels, machine load tests were conducted at 80° F. using TI-3 at 1/12 the additive level of C-1 in the manner of Example 6 using Fresh Start ®/Tergitol ® as the base detergent. The results are shown in Table 7.

TABLE 7

| | % Soil Release | |
|---|---|---|
| | Polymer | |
| Fabric | TI-3 (.25 g/liter) | C-1 (3.0 g/liter) |
| Dacron ® Single Knit | 86 | 85 |
| Dacron ® Double Knit | 83 | 80 |
| Dacron ® (65)/ Cotton (35) | 66 | 66 |
| Spun Nylon | 49 | 50 |
| Nylon Tricot | 78 | 76 |

EXAMPLE 11

The tests of Example 10 were expanded to cover more materials and a greater range of polymer loadings. The results are shown in Table 8.

TABLE 8

| | % Soil Release | | | | | | | | | |
|---|---|---|---|---|---|---|---|---|---|---|
| | Polymer Loading | | | | | | | | | |
| | 0 | | 0.25 | | 0.50 | | 1.0 | | 3.0 | |
| Polymer | TI-3 | C-1 | TI-3 | C-1 | TI-3 | C-1 | TI-3 | C-1 | TI-3 | C-1 |
| Dacron Single Knit | 35 | 35 | 86 | 69 | 85 | 83 | 86 | 85 | 86 | 85 |
| Dacron Double Knit | 32 | 32 | 83 | 41 | 81 | 73 | 84 | 79 | 82 | 80 |
| Dacron ® (65)/ Cotton (35) | 62 | 62 | 66 | 64 | 68 | 64 | 68 | 66 | 75 | 66 |
| Cotton Percale | 63 | 63 | 64 | 64 | 66 | 69 | 65 | 64 | 69 | 67 |
| Nylon Tricot | 75 | 75 | 78 | 74 | 75 | 74 | 77 | 77 | 78 | 76 |
| Spun Nylon | 46 | 46 | 49 | 49 | 51 | 49 | 55 | 47 | 63 | 50 |

EXAMPLE 11

Figure 4:
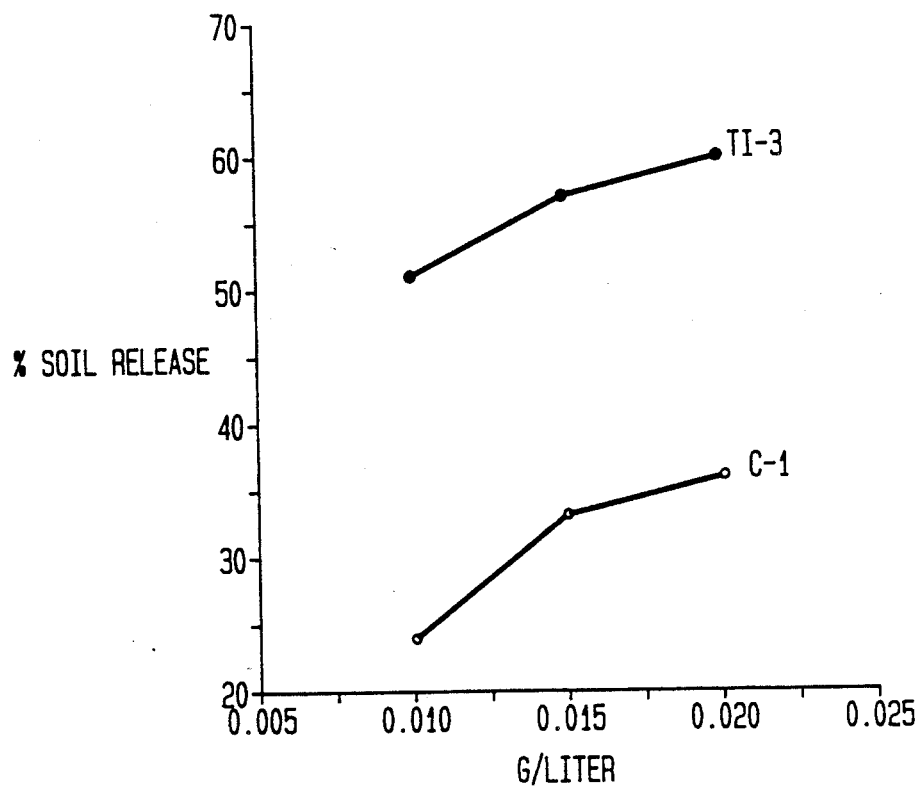
FIG. 4 is a plot of % soil release vs. soil release Polymer loading (grams/liter) for oily soil in cold (80° F.) water.
Figure 5:
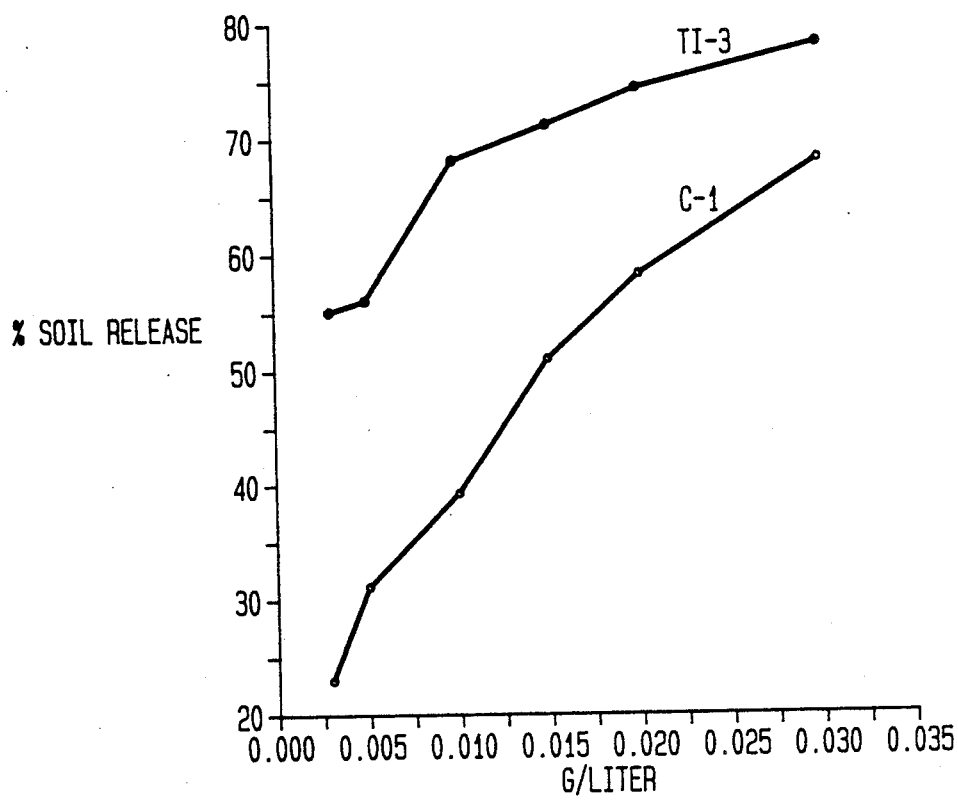
FIG. 5 is a plot of % soil release vs. soil release polymer loading (grams/liter) for oily soil in warm (120° F.) water.
Figure 6:
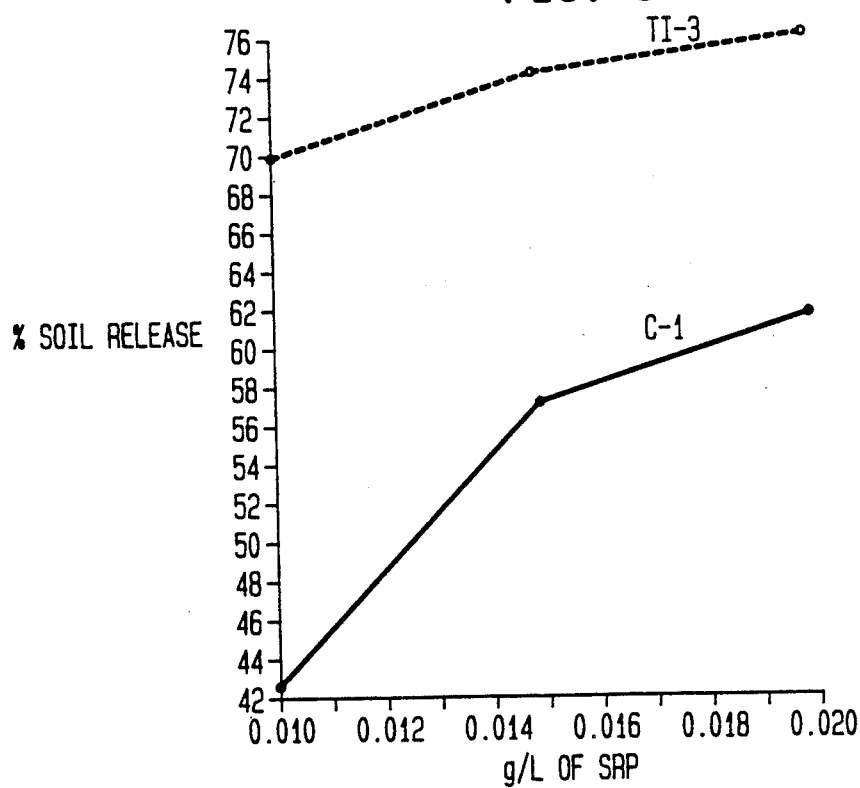
FIG. 6 is a plot of % soil release vs. soil release polymer loading (grams/liter) for general cleaning performance in warm (120° F.) water.

The results of numerous cleaning tests were averaged and plotted as % soil release vs. soil release polymer (SRP) level in grams/liter. These results are shown in FIG. 4 (oily soil removal in cold (80° F.) water), FIG. 5 (oily soil removal in warm (120° F.) water) and FIG. 6 (general cleaning performance in warm (120° F. water).

What is claimed is:

1. A substantially water-soluble soil release promoting polymer of the formula

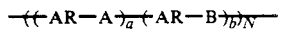

wherein each moiety AR of the polymer is independently selected from acid residues of carboxylic acids having at least two carboxylic acid groups, said acid residues having the formula $R^2(COO)_i$ wherein $R^2$ is an alkyl group of 4 to 12 carbon atoms having a valence of i or an aryl group of 6 to 10 carbon atoms having a valence of i, and i is an integer of 2 or more;

A is the moiety—$C_nH_{2n}$—$(OC_nH_{2n})_{\bar{x}-1}$;

B is the moiety—$C_mH_{2m}$—or the moiety

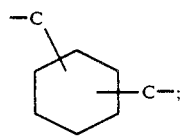

x is a number from about 12 to about 410, inclusive;
n is a number of from 2 to 4, inclusive;
m is a member of from 2 to 4, inclusive;
a+b=1.00;
a is a number of from about 0.20 to about 0.50, inclusive; and
N is an integer such that the weight average molecular weight of the polymer is from about 6,000 to about 40,000;
with the proviso that at least 50% of the total acid residues of carboxylic acids having at least two carboxylic acid groups are terephthalic acid residues; and
with the further proviso that, when B is —$C_mH_{2m}$—, at least 10% of the total acid residues of carboxylic acids having at least two carboxylic acid groups are a single isomeric form of a carboxylic acid having at least two carboxylic acid groups which is other than terephthalic acid.

2. The soil release promoting polymer according to claim 1, wherein x is a number from 72 to 110, inclusive.

3. The soil release promoting polymer according to claim 1, wherein x is about 90.

4. The soil release promoting polymer according to claim 1, wherein a is a number from about 0.25 to about 0.40, inclusive.

5. The soil release promoting polymer according to claim 1, wherein a is a number from about 0.25 to 0.30, inclusive.

6. The soil release promoting polymer according to claim 1, wherein said acid residues of carboxylic acids having at least two carboxylic acid groups are phthalic acid residues.

7. The soil release promoting polymer according to claim 6, wherein said single isomeric form of a carboxylic acid having at least two carboxylic acid groups is isophthalic acid.

8. The soil release promoting polymer according to claim 6, wherein B is $-C_mH_{2m}-$.

9. The soil release promoting polymer according to claim 10, wherein $n=m=2$.

10. The soil release promoting polymer according to claim 1, wherein said polymer is of the formula

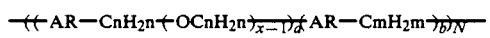

wherein each moiety AR of the polymer is independently selected from isomeric phthalic acid residues of the formula

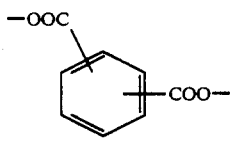

with at least 50% of the total phthalic acid residues being terephthalic acid residues and with at least 10% of the total phthalic acid residues being isophthalic acid residues;

$n=m=2$;

x is a number of from 12 to 410, inclusive;

$a+b=1.00$;

a is a number of from about 0.20 to about 0.50, inclusive; and

N is an integer such that the weight average molecular weight of the polymer is from 25,000 to 40,000.

11. The soil release polymer according to claim 10, wherein x is a number from 72 to 110, inclusive.

12. The soil release polymer according to claim 10, wherein x is about 90.

13. The soil release polymer according to claim 10, wherein a is a number from 0.25 to 0.40, inclusive.

14. The soil release polymer according to claim 10, wherein a is a number from 0.25 to 0.30, inclusive.

15. The soil release polymer according to claim 10, wherein said weight average molecular weight is from 25,000 to 35,000.

16. The soil release polymer according to claim 10, wherein said weight average molecular weight is about 31,000.

17. The soil release promoting polymer according to claim 10, wherein at least 15% of the total phthalic acid residues are isophthalic acid residues.

18. The soil release promoting polymer according to claim 10, wherein 15-20% of the total phthalic acid residues are isophthalic acid residues.

19. The soil release promoting polymer according to claim 18, wherein 15-20% of the total phthalic acid residues are isophthalic acid residues and the remainder of the total phthalic acid residues are terephthalic acid residues.

20. A substantially water-soluble soil release promoting polymer of the formula

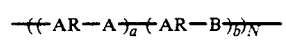

wherein each moiety AR of the polymer is independently selected from acid residues of carboxylic acids having at least two carboxylic acid groups;

A is the moiety of $-C_nH_{2n}-OC_nH_{2n})_{x-1}$;

B is the moiety $-C_mH_{2m}-$ or the moiety

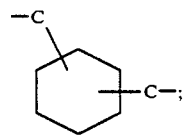

x is a number from about 12 to about 410, inclusive;

n is a number of from 2 to 4, inclusive;

m is a member of from 2 to 4, inclusive;

$a+b=1.00$;

a is a number of from about 0.20 to about 0.50, inclusive; and

N is an integer such that the weight average molecular weight of the polymer is from about 25,000 to about 40,000;

with the proviso that at least 50% of the total acid residues of carboxylic acids having at least two carboxylic acid groups are terephthalic acid residues; and with the further proviso that, when B is $-C_mH_{2m}-$, at least 10% of the total acid residues of carboxylic acids having at least two carboxylic acid groups are a single isomeric form of a carboxylic acid having at least two carboxylic acid groups which is other than terephthalic acid.

21. The soil release promoting polymer according to claim 20, wherein said weight average molecular weight is from about 25,000 to about 35,000.

22. A method for preparing a substantially water-soluble soil release promoting polymer of the formula

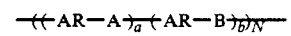

wherein each moiety AR of the polymer is independently selected from acid residues of carboxylic acids having at least two carboxylic acid groups;

A is the moiety $-C_nH_{2n}-(OC_nH_{2n})_{x-1}$;

B is the moiety $-C_mH_{2m}-$ or the moiety

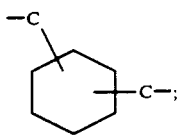

x is a number from about 12 to about 410; inclusive
n is a number of from 2 to 4, inclusive;
m is a number of from 2 to 4 inclusive;
a+b=1.00;
a is a number of from about 0.20 to about 0.50, inclusive; and
N is an integer such that the weight average molecular weight of the polymer is from about 6,000 to about 40 000;
with the proviso that at least 50% of the total acid residues of carboxylic acids having at least two carboxylic acid groups are terephthalic acid residues; and
with the further proviso that, when B is —CmH2m—, at least 10% of the total acid residues of carboxylic acids having at least two carboxylic acid groups are a single isomeric form of a carboxylic acid having at least two carboxylic acid groups which is other than terephthalic acid; said method comprising:
contacting a polyester of the formula

wherein AR and B are as defined above, and
M is an integer such that the weight average molecular weight of the polyester is from about 45,000 to about 75,000 with a polyol of the formula

wherein n and x are as defined above,
under reduced pressure and at a temperature in the range of from about 100° C. to no more than about 250° C. in the presence of a catalytically effective amount of a transesterification catalyst, wherein said polyester is present in an amount of about 15 to about 20% by weight, based on the sum of the polyester and polyol.

23. The method according to claim 22, wherein said polyester is present in an amount of about 17 to about 18% by weight, based on the sum of the polyester and polyol.

24. The method according to claim 22, wherein said transesterification catalyst is selected from the group consisting of M(OR)4, (R$^1$)2SnO and (R')2Sn(OC-(O)R$^2$)2, wherein M is selected from the group consisting of Zr Ge, Sn and Ti R is an alkyl or an aryl group, R$^1$ is an alkyl group and R$^2$ is H or an alkyl group.

25. The method according to claim 24, wherein R is an alkyl group of up to 4 carbon atoms.

26. The method according to claim 25, wherein M is Ti.

27. The method according to claim 26, wherein said transesterification catalyst is titanium tetraisopropoxide.

28. The method according to claim 24, wherein R$^1$ is an alkyl group of up to 4 carbon atoms and R2 is an alkyl group of up to 3 carbon atoms.

29. The method according to claim 28, wherein said transesterification catalyst is dibutyl tin oxide or dibutyl tin diacetate.

30. A soil release promoting built laundry detergent composition comprising
a detersively effective amount of at least one surfactant selected from the group consisting of water-soluble nonionic surface active agents and mixtures of anionic and nonionic surface active agents;
a detergent building effective amount of at least one water-soluble or water-dispersible detergent builder; and
a soil release promoting amount of substantially water-soluble soil release promoting polymer of the formula

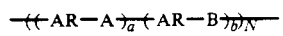

wherein each moiety AR of the polymer is independently selected from acid residues of carboxylic acids having at least two carboxylic acid groups;
A is the moiety —CnH2n(OCnH2n)$_{x-1}$;
B is the moiety —CmH2m— or the moiety

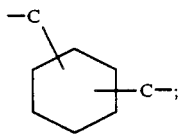

x is a number from about 12 to about 410; inclusive;
n is a number of from 2 to 4, inclusive;
m is a number of from 2 to 4 inclusive;
a+b=1.00;
a is a number of from about 0.20 to about 0.50, inclusive; and
N is an integer such that the weight average molecular weight of the polymer is from about 6,000 to about 40,000;
with the proviso that at least 50% of the total acid residues of carboxylic acids having at least two carboxylic acid groups are terephthalic acid residues; and
with the further proviso that, when B is —CmH2m—, at least 10% of the total acid residues of carboxylic acids having at least two carboxylic acid groups are a single isomeric form of a carboxylic acid having at least two carboxylic acid groups which is other than terephthalic acid.

31. The detergent composition according to claim 30, wherein x is a number from 72 to 110, inclusive.

32. The detergent composition according to claim 30, wherein x is about 90.

33. The detergent composition according to claim 30, wherein a is a number from about 0.25 to about 0.40, inclusive.

34. The detergent composition according to claim 30, wherein a is a number from about 0.25 to 0.30, inclusive.

35. The detergent composition according to claim 30, wherein said weight average molecular weight is from about 25,000 to about 40,000.

36. The detergent composition according to claim 30 wherein said weight average molecular weight is from about 25,000 to about 35,000.

37. The detergent composition according to claim 30, wherein said acid residues of carboxylic acids having at least two carboxylic acid groups are phthalic acid residues.

38. The detergent composition according to claim 37, wherein said single isomeric form of a carboxylic acid having at least two carboxylic acid groups is isophthalic acid.

39. The detergent composition according to claim 37, wherein B is —$C_mH_{2m}$—.

40. The detergent composition according to claim 39, wherein n=m=2.

41. The detergent composition according to claim 30, wherein said polymer is of the formula

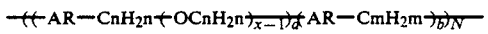

wherein each moiety AR of the polymer is independently selected from isomeric phthalic acid residues of the formula

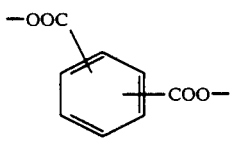

with at least 50% of the total phthalic acid residues being terephthalic acid residues and with at least 10% of the total phthalic acid residues being isophthalic acid residues;

n=m=2;

x is a number of from 12 to 410, inclusive;

a+b=1.00;

a is a number of from about 0.20 to about 0.50, inclusive; and

N is an integer such that the weight average molecular weight of the polymer is from 25,000 to 40,000.

42. The detergent composition according to claim 41, wherein x is a number from 72 to 110, inclusive.

43. The detergent composition according to claim 41, wherein x is about 90.

44. The detergent composition according to claim 41, wherein a is a number from 0.25 to 0.40, inclusive.

45. The detergent composition according to claim 41, wherein a is a number from 0.25 to 0.30, inclusive.

46. The detergent composition according to claim 41, wherein said weight average molecular weight is from 25,000 to 35,000.

47. The detergent composition according to claim 41, wherein said weight average molecular weight is about 31,000.

48. The detergent composition according to claim 41, wherein at least 15% of the total phthalic acid residues are isophthalic acid residues.

49. The detergent composition according to claim 41, wherein 15–20% of the total phthalic acid residues are isophthalic acid residues.

50. The detergent composition according to claim 49, wherein 15–20% of the total phthalic acid residues are isophthalic acid residues and the remainder of the total phthalic acid residues are terephthalic acid residues.

51. The detergent composition according to claim 41, wherein said detergent builder comprises a major portion of a carbonate.

52. The detergent composition according to claim 51, wherein said carbonate is sodium carbonate.

53. The detergent composition according to claim 30, which comprises from about 1 to about 65% by weight of said surfactant; from about 1 to about 65% by weight of said at least one detergent builder; and from about 0.1 to about 20% by weight of said soil release polymer.

54. The detergent composition according to claim 53, wherein said soil release polymer is present in an amount of from about 0.1 to about 10 by weight.

55. The detergent composition according to claim 30 which comprises from about 2 to about 40% by weight of said surfactant; from about 0.1 to about 20% by weight of said soil release polymer; from about 10 to about 50% by weight of said at least one detergent builder; and from about 0.5 to about 20% water.

56. The detergent composition according to claim 53 wherein said surfactant is comprised substantially of at least one normally liquid nonionic surface active agent.

57. The detergent composition according to claim 56 which is in the form of a substantially anhydrous liquid.

58. The detergent composition according to claim 55, which is in the form of freely flowing granules or powder.

* * * * *